US009802511B2

(12) United States Patent
Matsushima (10) Patent No.: US 9,802,511 B2
(45) Date of Patent: Oct. 31, 2017

(54) VEHICLE SEAT SLIDE MECHANISM (75) Inventor: Iwao Matsushima, Miyoshi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 821 days.

(21) Appl. No.: 13/334,552

(22) Filed: Dec. 22, 2011

(65) Prior Publication Data
US 2012/0181408 A1 Jul. 19, 2012

(30) Foreign Application Priority Data

Jan. 18, 2011 (JP) ................................. 2011-007832

(51) Int. Cl.
*B60N 2/07* (2006.01)
*B60N 2/08* (2006.01)

(52) U.S. Cl.
CPC ......... *B60N 2/0705* (2013.01); *B60N 2/0722* (2013.01); *B60N 2/0818* (2013.01); *B60N 2/0843* (2013.01)

(58) Field of Classification Search
CPC .. B60N 2/0705; B60N 2/0843; B60N 2/0722; B60N 2/0818
USPC ........... 248/424, 429, 125.8, 430; 296/65.13, 296/65.14, 65.15
See application file for complete search history.

(56) References Cited

U.S. PATENT DOCUMENTS

| 4,211,955 A | 7/1980 | Ray | |
| 6,688,574 B2* | 2/2004 | Okazaki | B60N 2/0705 248/424 |
| 6,869,057 B2* | 3/2005 | Matsumoto | B60N 2/0705 248/429 |
| 7,066,521 B2* | 6/2006 | Jung | B60N 2/0705 248/430 |
| 7,147,195 B2* | 12/2006 | Danjo | B60N 2/072 248/430 |
| 7,388,324 B2 | 6/2008 | Foo | |
| 7,661,647 B2* | 2/2010 | Ito | B60N 2/0232 248/429 |
| 8,033,520 B2* | 10/2011 | Fujieda | B60N 2/0727 248/430 |

(Continued)

FOREIGN PATENT DOCUMENTS

| CN | 1349065 | 5/2002 |
| CN | 1655318 | 8/2005 |

(Continued)

OTHER PUBLICATIONS www.espacenet.com Vehicle Seat Rail Assembly WO2009022214(A1).*

(Continued)

*Primary Examiner* — Muhammad Ijaz
(74) *Attorney, Agent, or Firm* — Greenblum & Bernstein, P.L.C.

(57) ABSTRACT

A vehicle seat slide mechanism via which a seat assembly is slidably mounted on a vehicle floor is provided with: a lower rail that is mounted on the vehicle floor; an upper rail which is slidably attached on the lower rail and on which the seat assembly is attached; a lock mechanism that locks the upper rail on the lower rail in a releasable manner; and a gap reduction member that is provided between a first face formed at the lower rail and facing in a substantially vertical direction and a second face formed at the upper rail and facing to the first face.

5 Claims, 5 Drawing Sheets

(56) References Cited

U.S. PATENT DOCUMENTS

| | | | |
|---|---|---|---|
| 8,091,851 B2* | 1/2012 | Yamada | B60N 2/0705 248/429 |
| 2005/0200285 A1 | 9/2005 | Foo | |
| 2007/0215778 A1* | 9/2007 | Kadlec | B60N 2/0722 248/429 |
| 2010/0065708 A1* | 3/2010 | Koga | B60N 2/067 248/429 |
| 2012/0145866 A1* | 6/2012 | Fukuda | B60N 2/0705 248/429 |
| 2012/0205512 A1* | 8/2012 | Fujishiro | B60N 2/0705 248/429 |

FOREIGN PATENT DOCUMENTS

| | | |
|---|---|---|
| CN | 201007995 | 1/2008 |
| CN | 101509616 | 8/2009 |
| CN | 101858495 | 10/2010 |
| EP | 1731352 | 12/2006 |
| JP | 63-176829 | 11/1988 |
| JP | 3520510 | 2/2004 |
| JP | 2005-178765 | 7/2005 |
| WO | WO2009022214 A1 * | 2/2009 |
| WO | 2010/096498 | 8/2010 |

OTHER PUBLICATIONS

China Office action with search report, dated Jul. 22, 2014 along with an english translation of search report.

Japan Office action, dated Jun. 17, 2014 along with an English translation thereof.

* cited by examiner

VEHICLE SEAT SLIDE MECHANISM

INCORPORATION BY REFERENCE

The disclosure of Japanese Patent Application No. 2011-007832 filed on Jan. 18, 2011 including the specification, drawings and abstract is incorporated herein by reference in its entirety.

BACKGROUND OF THE INVENTION

1. Field of the Invention

The invention relates to a vehicle seat slide mechanism via which a seat assembly is slidably mounted on the floor of a vehicle.

2. Description of Related Art

A vehicle seat slide mechanism has a lower rail mounted on the floor of a vehicle, an upper rail which is slidably attached on the lower rail and on which a seat assembly is attached, a lock mechanism that locks the upper rail on the lower rail in a releasable manner, and stoppers that define a range over which the upper rail is slidable relative to the lower rail (For example, refer to Japanese Patent No. 3520510).

However, there have been various demands for adding new functions to vehicle seat slide mechanisms.

SUMMARY OF THE INVENTION

An aspect of the invention relates to a vehicle seat slide mechanism having: a lower rail that is mounted on a vehicle floor; an upper rail which is slidably attached on the lower rail and on which the seat assembly is attached; a lock mechanism that locks the upper rail on the lower rail in a releasable manner; and a gap reduction member that is provided between a first face formed at the lower rail and facing in a substantially vertical direction and a second face formed at the upper rail and facing to the first face.

According to the vehicle seat slide mechanism described above, the vertical gap between the upper rail and the lower rail is small due to the presence of the gap reduction member. The vertical gap between the upper rail and the lower rail is necessary for enabling the upper rail to slide on the lower rail, and the size (length) of the vertical gap varies depending upon the form, shape, and the like, of each part. However, preferably, the vertical gap is, although depending on each case, small in size or length in terms of allowing the upper rail to tilt relative to the lower rail when the slide mechanism receives large force.

For example, it is often the case that as an impact is applied to the rear side of the vehicle, the weight of the occupant on the vehicle seat acts, due to the inertial force, on the seat assembly, and thus the occupant presses the seat assembly rearward. At this time, force is transferred to the upper rail from the seat assembly, resulting, for example, in the upper rail deforming to entirely, or partially, tilt, so that a part of the upper rail moves toward the lower rail. Such movement of the upper rail toward the lower rail is restricted by the upper rail hitting against the gap reduction member, that is, the tilting motion of the upper rail is reduced by the gap reduction member. As such, the gap reduction member reduces the tilting motion of the upper rail and thus reduces the rearward tilting movement, caused by the same tilting motion of the upper rail, of the seat assembly, resulting in a decrease in the distance that the seat assembly moves away from the head of the occupant. Accordingly, the head of the occupant is immediately received by the seat assembly, and thus the possibility of whiplash of the occupant is reduced.

In the meantime, conventionally, typical measures for preventing or reducing whiplash have been to increase the strengths of some parts of a seat assembly of a vehicle seat, such as increasing the thickness of the parts, using stronger materials for them, and shaping them to be higher in strength, however such measures are costly, causing an increase in the cost of the vehicle seat. On the other hand, a gap reduction member, such as the one described above, is simple in structure but is capable of restricting the tilting motion of the seat assembly, at the slide mechanism about which the seat assembly tilts when an impact is applied to the vehicle seat, for example. Therefore, the amount of the tilting motion of the seat assembly can be more effectively limited than in cases where a structure, arrangement, and the like, for coping with the tilting motion of the seat assembly is provided out of or distant from the center of the tilting motion of the seat assembly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
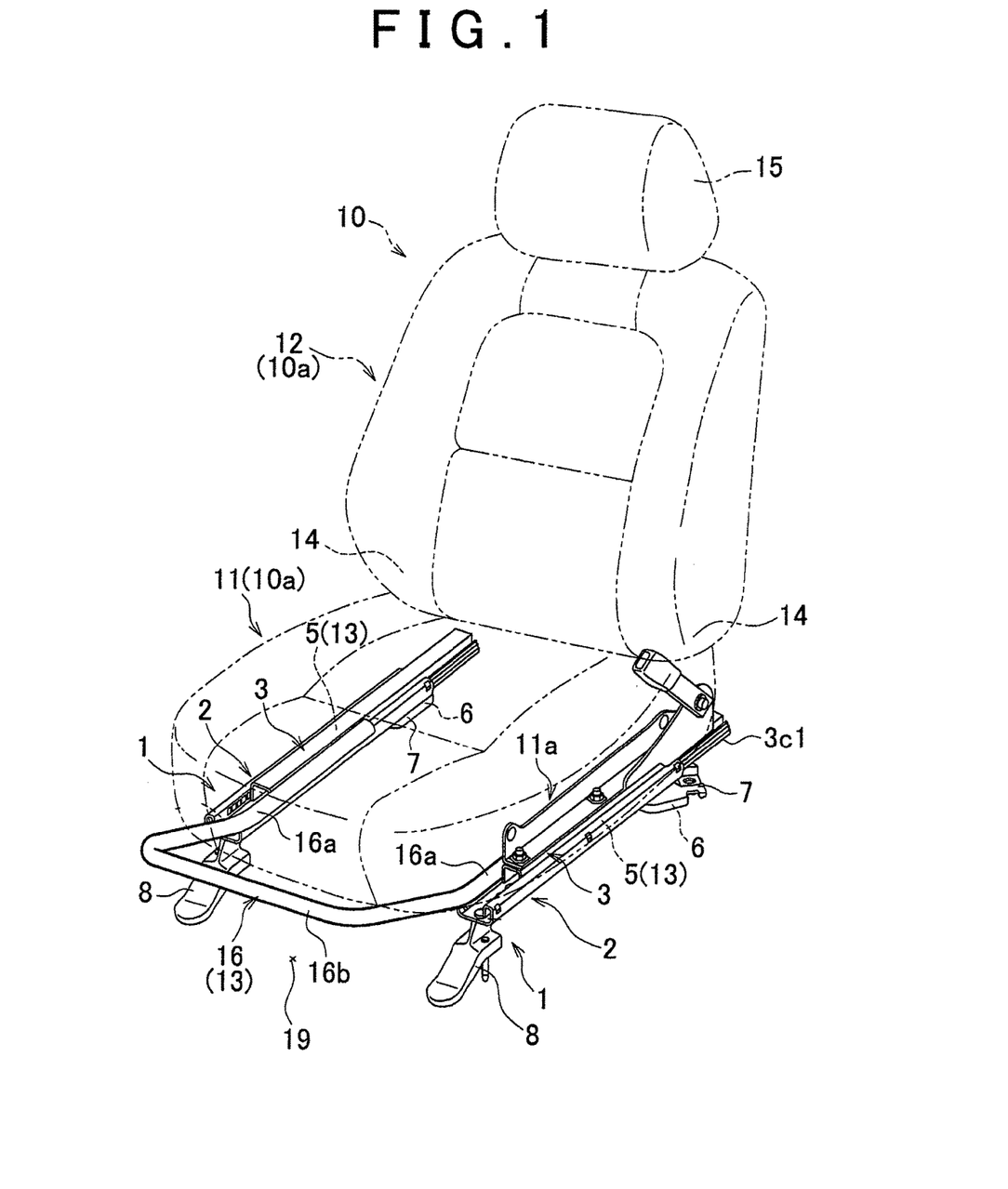
FIG. 1 is a perspective view of a vehicle seat.

An example embodiment of the invention will hereinafter be described with reference to FIGS. 1 to 5. Referring to FIG. 1, a vehicle seat 10 has a seat assembly 10a and a pair of slide mechanisms 1. The seat assembly 10a has a seat cushion 11 and a seatback 12. The seatback 12 is connected to the rear side of the seat cushion 11 via a reclining device 14, so that the seatback 12 is tiltable with respect to the seat cushion 11. A headrest 15 is provided on the top of the seatback 12. Support members 11a are provided at the lower sides of the left and right edges of the seat cushion 11, respectively. The support members 11a are attached on upper rails 3 of the respective slide mechanisms 1.

Figure 2:
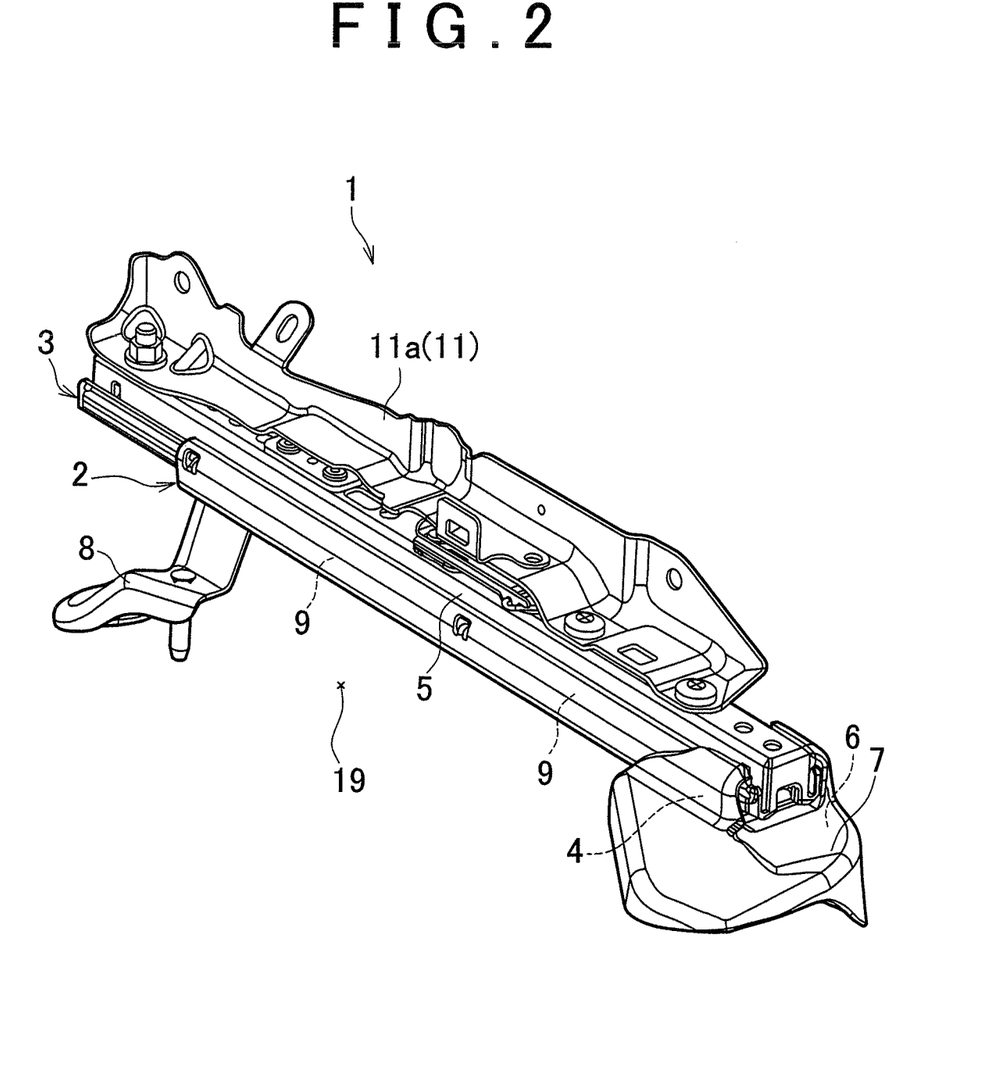
FIG. 2 is a perspective view of a slide mechanism.
Figure 3:
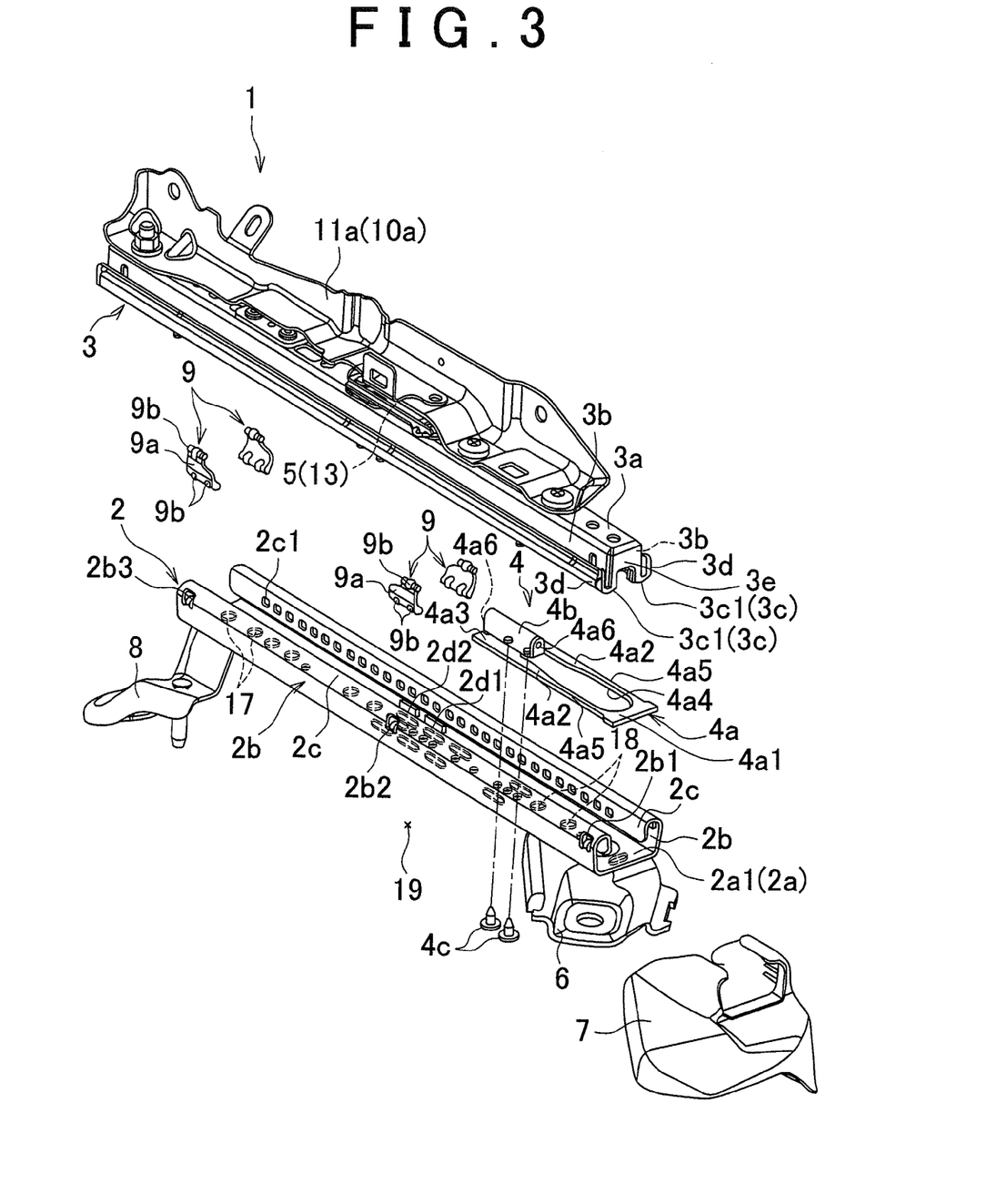
FIG. 3 is an exploded perspective view of the slide mechanism.

Referring to FIGS. 2 and 3, the slide mechanisms (seat tracks) 1 each have a lower rail 2 mounted on a floor 19 of the vehicle and the upper rail 3 slidably attached on the lower rail 2. Note that the lower rail 2 and the upper rail 3 extend in the longitudinal direction of the vehicle seat 10. Each lower rail 2 has a bottom portion 2a, sidewall portions 2b extending upward from, respectively, the left and right edges of the bottom portion 2a, a hanging-down portion 2c extending from the upper edge of one of the sidewall portions 2b toward the other of the sidewall portions 2b and then bending midway downward, and another hanging-down portions 2c extending from the upper edge of the other of the sidewall portions 2b toward the one of the sidewall portions 2b and then bending midway downward. The bottom portion 2a has a first face 2a1 facing upward to the upper rail 3. Each hanging-down portion 2c has a plurality of positioning holes $2c1$ arranged at given intervals in the longitudinal direction of the lower rail 2.

Figure 5:
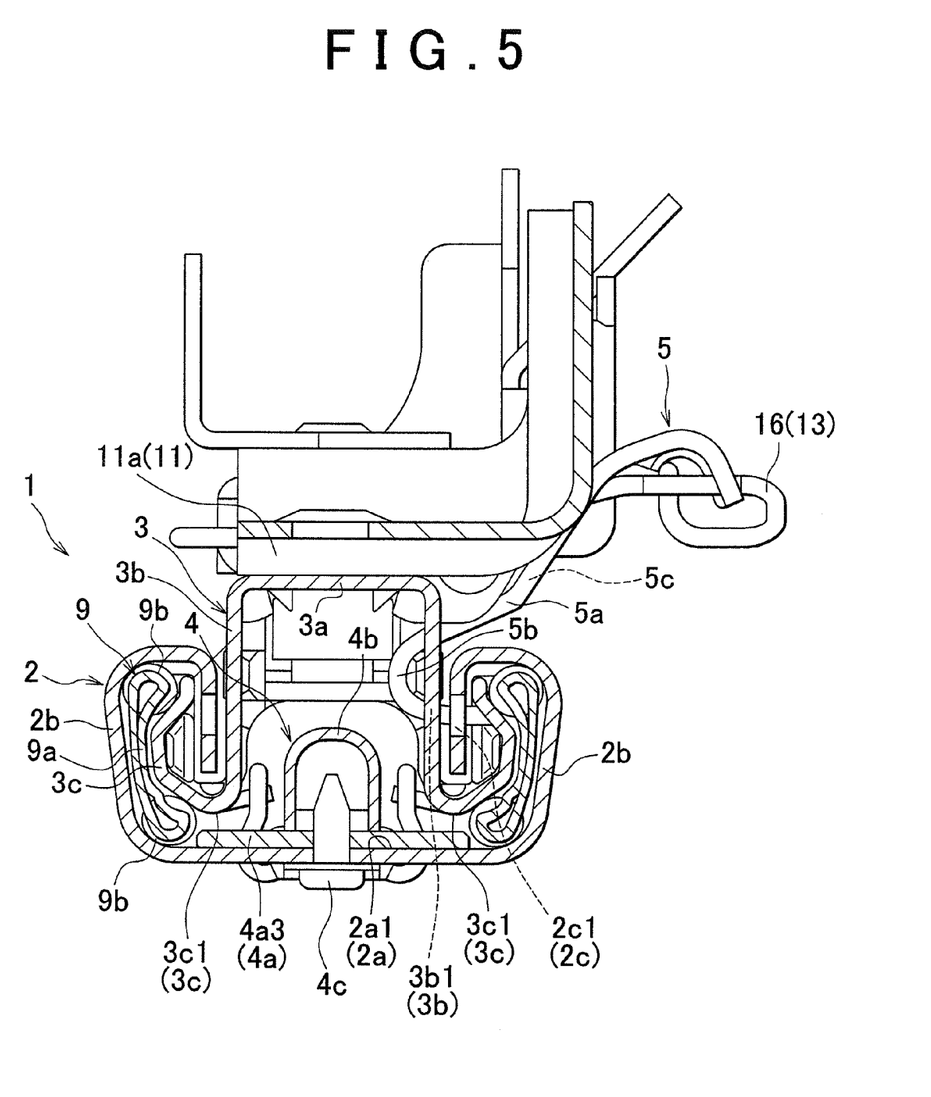
FIG. 5 is a sectional view taken along the line V-V in FIG. 4.

Referring to FIGS. 3 and 5, each upper rail 3 has a top wall portion $3a$, sidewall portions $3b$ extending downward from, respectively, the left and right edges of the top wall portion $3a$, a lower portion $3c$ extending from the lower edge of one of the sidewall portions $3b$ toward the side opposite to where the other of the sidewall portions $3b$ is present, another lower portion $3c$ extending from the lower edge of the other of the sidewall portions $3b$ toward the side opposite to where the one of the sidewall portions $3b$ is present, and wing portions $3d$ extending upward from the outer edges of the respective lower portions $3c$. The sidewall portions $3b$ are located between the two handing-down portions $2c$. Each lower portion $3c$ has a second face $3c1$ facing downward to the first face $2a1$ of the bottom portion $2a$ of the lower rail 2. Each wing portion $3d$ is located between the sidewall portion $2b$ and the hanging-down portion $2c$, at the corresponding side, of the lower rail 2. Two retainers 9 for allowing the upper rail 3 to slide with respect to the lower rail 2 are provided between the wing portion $3b$ and the sidewall portion $2b$ on one side, and another two retainers 9 are provided between the wing portion $3b$ and the sidewall portion $2b$ on the other side.

Referring to FIGS. 3 and 5, each retainer 9 has a housing $9a$ and balls $9b$ rotatably retained at the upper and lower sides of the housing $9a$, respectively. More specifically, the retainers 9 are provided at the front-left side, the front-right side, the rear-left side, and the rear-right side of the slide mechanism 1, respectively. The longitudinal movement of each retainer 9 at the rear side (i.e., the right side in FIG. 3) is restricted by stopper portions $2b1$ and $2b2$ protruding from the sidewall portion $2b$ toward the hanging-down portion $2c$, while the longitudinal movement of each retainer 9 at the front side (i.e., the left side in FIG. 3) is restricted by the stopper portion $2b2$ and a stopper portion $2b3$ protruding from the sidewall portion $2b$ toward the hanging-down portion $2c$. The retainers 9 provided at the gaps, on the left and right sides, between the upper rails 3 and the lower rails 2 suppress lateral rattling of the upper rails 3 relative to the respective lower rails 2.

Referring to FIG. 3, each lower rail 2 has stoppers $2d1$ and $2d2$ protruding upward from the bottom portion $2a$. When the upper rail 3 moves forward (i.e., leftward as viewed in FIG. 3), the stopper $2d1$ contacts a cap $3d$ attached at the rear end of the upper rail 3, restricting the forward movement of the upper rail 3. On the other hand, while the upper rail 3 moves rearward (i.e., rightward as viewed in FIG. 3), the stopper $2d2$ contacts a cap $3d$ attached at the front end of the upper rail 3, restricting the rearward movement of the upper rail 3.

Referring to FIG. 3, a gap reduction member 4 (e.g., a spacer) is provided between the lower rail 2 and the upper rail 3 on each side to reduce the vertical gap between them. Each gap reduction member 4 has a plate $4a$ and a cover $4b$. The plate $4a$ may be a metal plate, a resin plate, or a plate produced by applying resin coating on a metal core. In this example embodiment, the plate $4a$ is a single piece plate having a rear portion $4a1$, left and right portions (side portions) $4a2$, and a front portion $4a3$.

Figure 4:
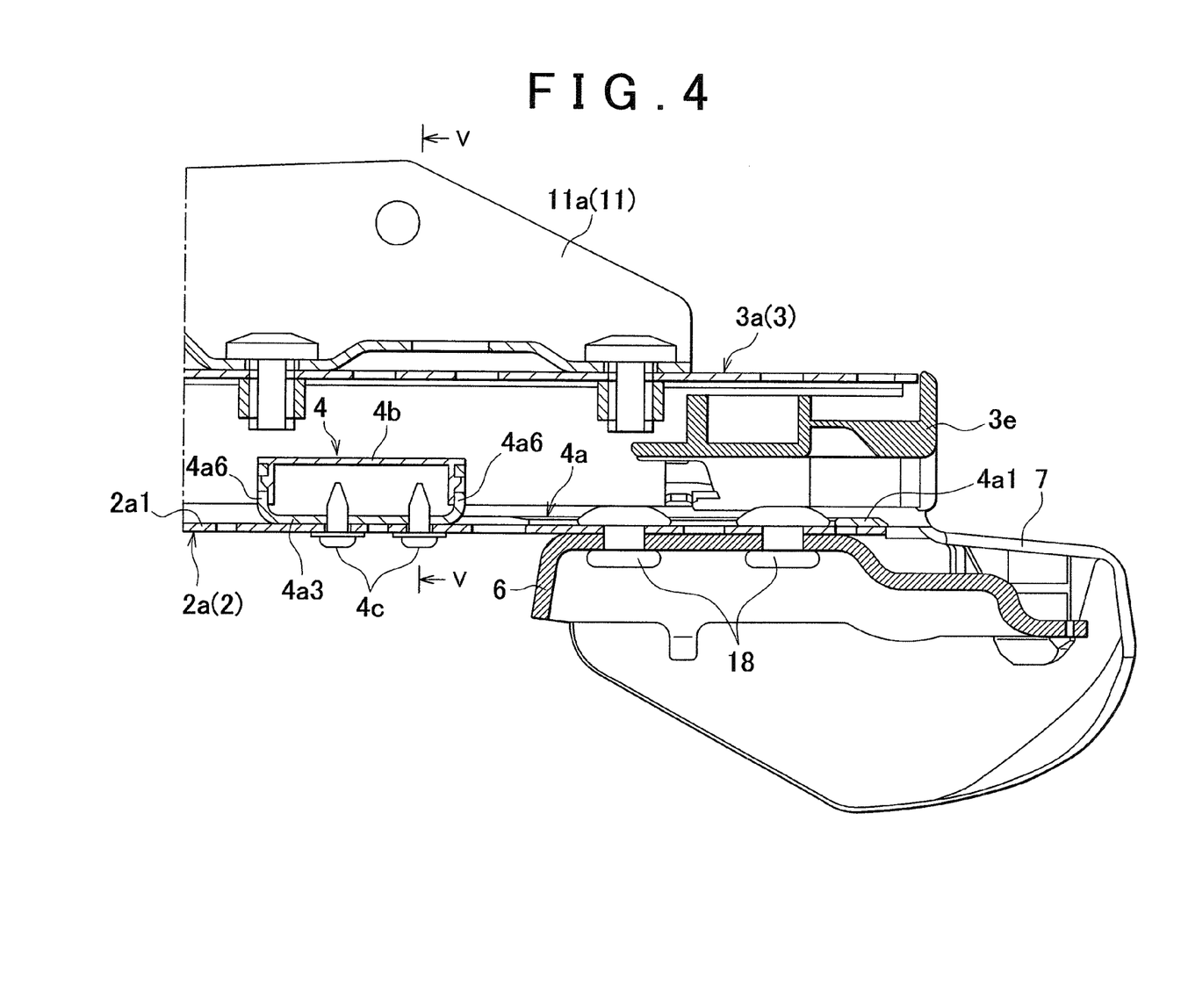
FIG. 4 is a longitudinal sectional view of a part of the slide mechanism.

Referring to FIGS. 3 and 4, the rear portion $4a1$ is arranged at the rear edge of the first face $2a1$ of the lower rail 2, and the side portions $4a2$ extend forward from the rear portion $4a1$. An opening $4a4$ is formed between the side portions $4a2$. Attachments 18 for attaching a leg 6 to the lower rail 2 are fit in the opening $4a4$. Recesses $4a5$ for avoiding interferences with the respective retainers 9 are provided at the outer edges of the respective side portions $4a2$.

Referring to FIGS. 3 and 4, the front portion $4a3$ is provided at the front ends of the respective side portions $4a2$. The front portion $4a3$ is attached on the bottom portion $2a$ using screws $4c$. Rising portions $4a6$ that rise up from the front portion $4a3$ are provided at the front and rear edges of the front portion $4a3$, respectively. A cover $4b$ covering the tips of the respective screws $4c$, which project upward through the front portion $4a3$, is attached on the rising portions $4a6$.

Referring to FIG. 5, the plate $4a$ is arranged between the first face $2a1$ of the lower rail 2 and the second faces $3c1$ of the upper rail 3. The larger the thickness of the plate $4a$, the smaller the vertical gaps between the first face $2a1$ of the lower rail 2 and the respective second faces $3c1$ of the upper rail 3. The longitudinal length of the plate $4a$ is set such that at least a portion of the plate $4a$ is always present between the first face $2a1$ of the lower rail 2 and the second faces $3c1$ of the upper rail 3 wherever the upper rail 3 is located relative to the lower rail 2 as a result of its longitudinal sliding.

Referring to FIG. 3, the leg 6 is attached to the rear portion (i.e., the portion in the right side of FIG. 3) of the lower rail 2, and another leg 8 is attached to the front portion (i.e., the portion in the left side of FIG. 3) of the lower rail 2. The legs 6 and 8 are both made of metal, and they are attached to the bottom face of the bottom portion $2a$ of the lower rail 2 via attachments 17 and the attachments 18, respectively. Further, the legs 6 and 8 are bolted on the floor 19. A leg cover 7, which is made of resin, is attached on the leg 6.

Referring to FIGS. 1 and 5, a lock mechanism 13 for locking the upper rail 3 on the lower rail 2 in a releasable manner is provided between the lower rail 2 and the upper rail 3. The lock mechanism 13 is provided with lock member 5, urging member (not shown in the drawings) that urge the lock member 5, and an operation member 16 that is used to manually operate the lock members 5.

Referring to FIG. 1, the operation member 16 has extension portions $16a$ longitudinally extending along the respective slide mechanisms 1 and a connection portion $16b$ interconnecting the front ends of the respective extension portions $16a$, which are all integrally formed or provided. The center portion of each extension portion $16a$ is attached to the corresponding upper rail 3 such that the operation member 16 is pivotable, and the rear end portion of each extension portion $16a$ is connected to the corresponding lock member 5.

Referring to FIG. 5, each lock member 5 has a body $5a$ that is laterally tiltable relative to the upper rail 3. A hook $5b$ is formed at one end of the body $5a$. When the lock member 5 is in its tilted position, the hook $5b$ is inserted, in a releasable manner, in both a hole $3b1$ formed in the corresponding side portion $3b$ of the upper rail 3 and a selected one of the positioning holes $2c1$ of the lower rail 2. An extension portion $5c$ is formed at the other end of the body $5a$, and the extension portion $5c$ extends to the outside of the upper rail 3 from the body $5a$. The extension portion $5c$ is connected to the rear end of the operation member 16.

The urging member (not shown in the drawings) is provided between the lock member 5 and the upper rail 3 and urges the lock member 5 in such a direction to insert the hook $5b$ of the lock mechanism 5 into the hole $3b1$ of the upper rail 3 and into the selected one of the positioning holes $2c1$ of the lower rail 2. Referring to FIGS. 1 and 5, as the connection portion $16b$ of the operation member 16 is lifted up, each extension portion 16a, connected to the connection portion 16b, presses the extension portion 5c of the lock member 5 downward against the urging force of the urging member, whereby the hook 5b of the lock member 5 is released from the selected one of the positioning holes 2c1 of the lower rail 2, allowing the upper rail 3 to slide on the lower rail 2. As the operation member 16 is released, the hook 5b of the lock mechanism 5 gets into the newly selected poisoning hole 2c1 of the lower rail 2, so that the upper rail 3 is set in the selected position relative to the lower rail 2 (refer to FIG. 5).

As described above, each slide mechanism 1 is provided with, as shown in FIG. 3, the lower rail 2 mounted on the floor 19 of the vehicle, the upper rail 3 which is slidably attached on the lower rail 2 and on which the seat assembly 10a is attached, the lock mechanism 13 that locks the upper rail 3 on the lower rail 2 in a releasable manner, and the gap reduction member 4 that is provided between the first face 2a1 formed at the lower rail 2 so as to face upward (i.e., an example of "in a vertical or substantially vertical direction") and the second face 3c1 formed at the upper rail 3 so as to face to the first face 2a1.

According to the structure described above, therefore, the vertical gaps between the upper rails 3 and the lower rails 2 at the respective sides are small due to the presence of the gap reduction members 4. The vertical gaps between the upper rails 3 and the lower rails 2 are necessary for enabling the upper rails 3 to slide on the respective lower rails 2, and the sizes (lengths) of the respective vertical gaps vary depending upon the form, shape, and the like, of each part. However, preferably, these vertical gaps are, although depending on each case, small in size or length in terms of allowing the upper rails 3 to tilt relative to the respective lower rails 2 when the slide mechanism 1 receives large force.

For example, it is often the case that as an impact is applied to the rear side of the vehicle, the weight of the occupant on the vehicle seat 10 acts, due to the inertial force, on the seat assembly 10a, and thus the occupant presses the seat assembly 10a rearward. At this time, force is transferred to the upper rails 3 from the seat assembly 10a, resulting, for example, in the upper rail 3 deforming to entirely, or partially, tilt, so that a part of the upper rail 3 moves toward the lower rail 2. Such movements of the upper rails 3 toward the respective lower rails 2 are restricted by the upper rails 3 hitting against the respective gap reduction members 4, that is, the tilting motions of the upper rails 3 are reduced by the gap reduction members 4. As such, the gap reduction members 4 reduce the tilting motions of the respective upper rails 3 and thus reduce the rearward tilting movement, caused by the same tilting motions of the respective upper rails 3, of the seat assembly 10a, resulting in a decrease in the distance that the seat assembly 10a moves away from the head of the occupant. Accordingly, the head of the occupant is immediately received by the seat assembly 10a, and thus the possibility of whiplash of the occupant is reduced.

In the meantime, conventionally, typical measures for preventing or reducing whiplash have been to increase the strengths of some parts of a seat assembly of a vehicle seat, such as increasing the thickness of the parts, using stronger materials for them, and shaping them to be higher in strength, however such measures are costly, causing an increase in the cost of the vehicle seat. On the other hand, referring back to the example embodiment of the invention, the gap reduction members 4 are simple in structure but are capable of restricting the tilting motion of the seat assembly 10a, at the respective slide mechanisms 1 about which the seat assembly 10a tilts when an impact is applied to the vehicle seat 10, for example. Therefore, the amount of the tilting motion of the seat assembly 10a can be more effectively limited than in cases where a structure, arrangement, and the like, for coping with the tilting motion of the seat assembly 10a is provided out of or distant from the center of the tilting motion of the seat assembly 10a.

Referring to FIG. 1, the front ends (front end portions) of the upper rails 3, at which the respective second faces 3c1 are provided, project away from the respective lower rails 2 as the upper rails 3 slide forward on the respective lower rails 2, while the rear ends (rear end portions) of the upper rails 3 project away from the respective lower rails 2 as the upper rails 3 slide rearward on the respective lower rails 2. However, since the gap reduction members 4 are attached on the respective lower rails 2, regardless of whether the upper rails 3 are sliding or not, the gap reduction members 4 remain stationary relative to the floor 19 and therefore do not interfere with the parts on the floor 19 side. That is, if the gap reduction members 4 were attached to the respective upper rails 3, they would possibly project, as the upper rails 3 slide, from the respective lower rails 2 and thus interfere with the parts on the floor 19 side, which is not desirable.

According to the example embodiment of the invention, as shown in FIGS. 3 and 4, the gap reduction members 4 are attached on the rear end portions (i.e., the end portions on the side opposite from the traveling direction of the vehicle) of the respective lower rails 2, and the lengths of the respective gap reduction members 4 are such that the gap reduction members 4 are always present between the upper rails 3 and the lower rails 2 wherever the upper rails 3 are located relative to the respective lower rails 2 as a result of their sliding on the lower rails 2. That is, the front ends of the respective gap reduction members 4 are located forward of the rear ends of the respective upper rails 3 even when the upper rails 3 are at the forward ends of their sliding ranges. As such, the gap reduction members 4 are capable of reducing the tilting motion of the seat assembly 10a reliably, and effectively, when an impact is applied to the rear side of the vehicle.

More specifically, as an impact is applied to the rear side of the vehicle, the weight of the occupant on the vehicle seat 10 presses, due to the inertial force of his or her weight, the seat assembly 10a rearward, that is, the seat assembly 10a receives force that causes the seat assembly 10a to tilt about the rear sides of the respective upper rails 3, so that the rear ends of the respective upper rails 3 move downward. However, at this time, due to the gap reduction members 4 provided at the rear end portions of the respective lower rails 2 which cover portions immediately below the rear ends of the respective upper rails 3, the tilting motions of the upper rails 3 are effectively reduced by the gap reduction members 4. Further, it is to be noted that the gap reduction members 4 reduce such tilting motions of the upper rails 3 regardless of where the upper rails 3 are located relative to the respective lower rails 2.

Further, referring to FIG. 3, each slide mechanism 1 has the leg 6 and the attachments 18 for attaching the leg 6 to the corresponding lower rail 2, and each gap reduction member 4 has the opening 4a4 that is formed so as to avoid any contact between the gap reduction member 4 and the attachments 18. As such, each gap reduction member 4 can be attached on a desired position of the lower rail 2, such as the rear end portion of the lower rail 2, without any interference by the attachments 18.

The invention has been described with reference to the example embodiment for illustrative purposes only. It should be understood that the description is not intended to be exhaustive or to limit form of the invention. For example, the invention may alternatively be embodied as follows. First, the gap reduction members 4 shown in FIG. 1 may alternatively be attached on the upper rails 3, not the lower rails 2.

Further, a lower rail of which the shape is substantially identical to that of the upper rail 3 shown in FIG. 3 but is inverted upside down and an upper rail of which the shape is substantially identical to that of the lower rail 2 shown in FIG. 3 but is inverted upside down may be used. In this case, each lower rail has "first face" facing upward, that is, a face corresponding to the second face 3c1 shown in FIG. 3 but facing upward, not downward, while each upper rail has "second face" facing to the first face, that is, a face corresponding to the first face 2a1 shown in FIG. 3 but facing to the first face downward, not upward, and the gap reduction member 4 is provided between the first face of the lower rail and the second face of the upper rail.

Further, each gap reduction member 4 may be attached on the lower rail 2 using a rivet(s) or a hook(s) in place of the screws 4c.

Further, the gap reduction members 4 may alternatively be provided at the front end portions of the respective lower rails 2, or various portions other than the rear end portions. That is, wherever the gap reduction members 4 are located on the respective lower rails 2 or on the respective upper rails 3, the gap reduction members 4 serve to restrict the movements of the upper rails 3 toward the lower rails 2 and thereby reduce the tilting motion of the seat assembly 10a.

Further, each lower rail 2 may be mounted on the floor 19 via a member(s) other than the legs 6 and 8, or may be directly mounted on the floor 19.

The slide mechanism 1 may be used in various vehicles including motor vehicles, air planes, vessels, boats, and so on.

The gap reduction members 4 are different members from the respective lower rails 2 or upper rails 3. Alternatively the gap reduction members 4 may be integral with the respective lower rails 2 or upper rails 3.

What is claimed is:

1. A vehicle seat slide mechanism which slidably mounts a seat assembly on a vehicle floor, comprising:
    a lower rail that is mounted on the vehicle floor;
    an upper rail which is slidably attached on the lower rail and on which the seat assembly is attached;
    a lock mechanism that locks the upper rail on the lower rail in a releasable manner; and
    a gap reduction member that is provided between a first face formed at the lower rail and facing in a substantially vertical direction and a pair of second faces formed at lowermost portions of the upper rail and facing to the first face;
    wherein the gap reduction member is attached, as viewed in a longitudinal direction of the vehicle seat, on a rear end portion of the lower rail, and a longitudinal length of the gap reduction member is such that at least a portion of the gap reduction member is present between the upper rail and the lower rail, regardless of where the upper rail is located in a sliding range over which the upper rail is slidable relative to the lower rail.

2. The vehicle seat slide mechanism according to claim 1, wherein as the upper rail slides relative to the lower rail, one end of the upper rail projects away from the lower rail in a direction in which the upper rail is sliding.

3. The vehicle seat slide mechanism according to claim 1, wherein a front end of the gap reduction member is located forward of a rear end of the upper rail when the upper rail is located at a forward end of the sliding range, with respect to the lower rail.

4. The vehicle seat slide mechanism according to claim 1, wherein the gap reduction member is a spacer.

5. The vehicle seal slide mechanism according to claim 1, wherein
    the gap reduction member includes a cover and the plate,
    the plate has a front portion and a rear portion, and
    the cover is disposed at the front portion of the plate and an opening is defined in the rear portion of the plate.

* * * * *